(12) United States Patent
Kasamsetty et al.

(10) Patent No.: US 7,415,470 B2
(45) Date of Patent: Aug. 19, 2008

(54) CAPTURING AND RE-CREATING THE STATE OF A QUEUE WHEN MIGRATING A SESSION

(75) Inventors: Ravikanth Kasamsetty, Union City, CA (US); Ravi Koti, Bangalore (IN); Sanjay H. Kaluskar, Menlo Park, CA (US); Chao Liang, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 455 days.

(21) Appl. No.: 11/131,653

(22) Filed: May 17, 2005

(65) Prior Publication Data

US 2006/0059228 A1 Mar. 16, 2006

Related U.S. Application Data

(60) Provisional application No. 60/668,390, filed on Apr. 4, 2005, provisional application No. 60/601,346, filed on Aug. 12, 2004, provisional application No. 60/601,250, filed on Aug. 12, 2004, provisional application No. 60/601,259, filed on Aug. 12, 2004.

(51) Int. Cl.
*G06F 7/00* (2006.01)
*G06F 17/30* (2006.01)

(52) U.S. Cl. ........................... 707/10; 707/101; 707/202

(58) Field of Classification Search .................... 707/10, 707/202, 101
See application file for complete search history.

(56) References Cited

U.S. PATENT DOCUMENTS 3,444,528 A 5/1969 Lovell et al.
4,221,933 A * 9/1980 Cornell et al. ............... 379/84
4,586,134 A 4/1986 Norstedt (Continued)

FOREIGN PATENT DOCUMENTS

EP 0 942 363 A2 9/1999

(Continued)

OTHER PUBLICATIONS

Coulouris et al., "Distributed Systems, Concepts and Design", 1994, Addison-Wesley.
Gunther, Oliver, et al., "MMM: A Web-Based System for Sharing Statistical Computing Modules," IEEE, May-Jun. 1997, vol. 1, Issue 3, pp. 59-68.
IBM, "Local Area Network Server Replacement Procedure" IBM Technical Disclosure Bulletin, Jan. 1995.

(Continued)

*Primary Examiner*—Hosain T Alam
*Assistant Examiner*—Van H Ngo
(74) *Attorney, Agent, or Firm*—Hickman Palermo Truong & Becker (57) ABSTRACT

A method and apparatus for migrating the session state of an original session from a first node to a second node, such that a process, executing in the migrated session, may enqueue and dequeue messages from a queue of messages and experience the same behavior from the queue of messages as if the process was enqueuing and dequeuing messages in the original session. Advantageously, all the benefits of migrating a session from one node to another node may be realized, even when the session contains queuing state information that describes the state of a queue of messages. Data that indicates how many messages one or more subscribers have removed from the queue of messages may also be stored to preserve proper behavior of the queue of messages for multiple subscribers when sessions are migrated.

20 Claims, 6 Drawing Sheets

U.S. PATENT DOCUMENTS

| | | | |
|---|---|---|---|
| 4,868,832 A | 9/1989 | Marrington et al. | |
| 5,047,922 A | 9/1991 | Borkar | |
| 5,157,663 A | 10/1992 | Major et al. | |
| 5,179,660 A | 1/1993 | Devany et al. | |
| 5,247,664 A | 9/1993 | Thompson et al. | |
| 5,247,671 A | 9/1993 | Adkins et al. | |
| 5,289,461 A | 2/1994 | de Nijs | |
| 5,319,754 A | 6/1994 | Meinecke et al. | |
| 5,333,269 A * | 7/1994 | Calvignac et al. | 709/215 |
| 5,392,285 A | 2/1995 | Kurts | |
| 5,448,559 A | 9/1995 | Hayter et al. | |
| 5,530,905 A | 6/1996 | Nichols et al. | |
| 5,535,326 A | 7/1996 | Baskey et al. | |
| 5,544,313 A | 8/1996 | Shachnai et al. | |
| 5,553,242 A | 9/1996 | Russell et al. | |
| 5,566,225 A | 10/1996 | Haas | |
| 5,566,297 A | 10/1996 | Devarakonda et al. | |
| 5,596,720 A | 1/1997 | Hamada et al. | |
| 5,596,745 A | 1/1997 | Lai et al. | |
| 5,598,536 A | 1/1997 | Slaughter, III et al. | |
| 5,600,722 A | 2/1997 | Yamaguchi et al. | |
| 5,617,540 A | 4/1997 | Civanlar et al. | |
| 5,633,861 A | 5/1997 | Hanson et al. | |
| 5,633,999 A | 5/1997 | Clowes et al. | |
| 5,642,515 A | 6/1997 | Jones et al. | |
| 5,652,908 A | 7/1997 | Douglas et al. | |
| 5,666,479 A | 9/1997 | Kashimoto et al. | |
| 5,682,534 A | 10/1997 | Kapoor et al. | |
| 5,684,800 A | 11/1997 | Dobbins et al. | |
| 5,696,895 A | 12/1997 | Hemphill et al. | |
| 5,721,918 A | 2/1998 | Nilsson et al. | |
| 5,734,659 A | 3/1998 | Mann et al. | |
| 5,734,896 A | 3/1998 | Rizvi et al. | |
| 5,740,175 A | 4/1998 | Wakeman et al. | |
| 5,761,507 A | 6/1998 | Govett | |
| 5,771,349 A | 6/1998 | Picazo, Jr. et al. | |
| 5,774,660 A | 6/1998 | Brendel et al. | |
| 5,784,630 A | 7/1998 | Saito et al. | |
| 5,790,800 A | 8/1998 | Gauvin et al. | |
| 5,796,934 A | 8/1998 | Bhanot et al. | |
| 5,796,941 A | 8/1998 | Lita | |
| 5,796,999 A | 8/1998 | Azagury et al. | |
| 5,805,816 A | 9/1998 | Picazo, Jr. et al. | |
| 5,805,827 A | 9/1998 | Chau et al. | |
| 5,805,920 A | 9/1998 | Sprenkle et al. | |
| 5,819,019 A | 10/1998 | Nelson | |
| 5,819,298 A | 10/1998 | Wong et al. | |
| 5,828,879 A | 10/1998 | Bennett | |
| 5,832,483 A | 11/1998 | Barker | |
| 5,850,507 A | 12/1998 | Ngai et al. | |
| 5,862,362 A | 1/1999 | Somasegar et al. | |
| 5,867,713 A | 2/1999 | Shrader et al. | |
| 5,870,545 A | 2/1999 | Davis et al. | |
| 5,870,562 A | 2/1999 | Butman et al. | |
| 5,870,746 A | 2/1999 | Knutson et al. | |
| 5,884,035 A | 3/1999 | Butman et al. | |
| 5,890,167 A | 3/1999 | Bridge, Jr. et al. | |
| 5,890,169 A | 3/1999 | Wong et al. | |
| 5,890,963 A | 4/1999 | Yen | |
| 5,944,823 A | 8/1999 | Jade et al. | |
| 5,951,694 A | 9/1999 | Choquier et al. | |
| 5,963,556 A | 10/1999 | Varghese et al. | |
| 5,974,463 A | 10/1999 | Warrier et al. | |
| 5,978,849 A | 11/1999 | Khanna | |
| 5,987,430 A | 11/1999 | Van Horne et al. | |
| 6,006,264 A | 12/1999 | Colby et al. | |
| 6,026,430 A | 2/2000 | Butman et al. | |
| 6,035,412 A | 3/2000 | Tamer et al. | |
| 6,038,677 A | 3/2000 | Lawlor et al. | |
| 6,041,357 A | 3/2000 | Kunzelman et al. | |
| 6,047,323 A | 4/2000 | Krause | |
| 6,058,389 A * | 5/2000 | Chandra et al. | 707/1 |
| 6,088,728 A | 7/2000 | Bellemore et al. | |
| 6,205,498 B1 * | 3/2001 | Habusha et al. | 710/29 |
| 6,243,751 B1 | 6/2001 | Chatterjee et al. | |
| 6,442,568 B1 | 8/2002 | Velasco et al. | |
| 6,473,794 B1 | 10/2002 | Guheen et al. | |
| 6,519,571 B1 | 2/2003 | Guheen et al. | |
| 6,536,037 B1 | 3/2003 | Guheen et al. | |
| 6,601,101 B1 | 7/2003 | Lee et al. | |
| 6,604,110 B1 | 8/2003 | Savage et al. | |
| 6,667,751 B1 | 12/2003 | Wynn et al. | |
| 6,691,155 B2 | 2/2004 | Gottfried | |
| 6,978,305 B1 * | 12/2005 | Nainani et al. | 709/225 |
| 7,072,911 B1 * | 7/2006 | Doman et al. | 707/201 |
| 7,093,088 B1 * | 8/2006 | Todd et al. | 711/162 |
| 7,107,294 B2 | 9/2006 | Romanufa et al. | |
| 2001/0047270 A1 | 11/2001 | Gusick et al. | |
| 2002/0073019 A1 | 6/2002 | Deaton | |
| 2002/0073139 A1 | 6/2002 | Hawkins et al. | |
| 2002/0116457 A1 | 8/2002 | Eshleman et al. | |
| 2002/0161896 A1 | 10/2002 | Wen et al. | |
| 2003/0007497 A1 | 1/2003 | March et al. | |
| 2003/0108052 A1 | 6/2003 | Inoue et al. | |
| 2003/0177187 A1 | 9/2003 | Levine et al. | |
| 2003/0217159 A1 | 11/2003 | Schramm-Apple et al. | |
| 2003/0236834 A1 | 12/2003 | Gottfried | |
| 2004/0024771 A1 | 2/2004 | Jain et al. | |
| 2004/0024774 A1 | 2/2004 | Jain et al. | |
| 2004/0024794 A1 | 2/2004 | Jain et al. | |
| 2004/0034640 A1 | 2/2004 | Jain et al. | |
| 2004/0034664 A1 | 2/2004 | Jain et al. | |
| 2004/0107125 A1 | 6/2004 | Guheen et al. | |
| 2005/0049993 A1 * | 3/2005 | Nori et al. | 707/1 |
| 2005/0239476 A1 | 10/2005 | Betrabet et al. | |
| 2006/0036617 A1 | 2/2006 | Bastawala et al. | |
| 2006/0184535 A1 | 8/2006 | Kaluskar et al. | |

FOREIGN PATENT DOCUMENTS

| | | |
|---|---|---|
| EP | 0 992 909 A2 | 4/2000 |
| EP | 1 170 662 A2 | 1/2002 |
| WO | WO 02/05116 A2 | 1/2002 |
| WO | WO 02/097676 A2 | 12/2002 |
| WO | WO 03/014928 A2 | 2/2003 |
| WO | WO 03/062983 A2 | 7/2003 |

OTHER PUBLICATIONS

Kokku, Ravi et al., "Half-pipe Anchoring: An Efficient Technique for Multiple Connection Handoff," Proceedings 10th International Conference on Network Protocols, Nov. 12, 2002, XP010632563, 10 pages.

Kurakawa, Kei et al., "Life Cycle Design Support Based on Environmental Information Sharing," IEEE, Feb. 1-3, 1999, Proceedings EcoDesign '99, First International Symposium, pp. 138-142.

Lin, Ying-Dar et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

Satyanarayanan, Mahadev, "CODA: A Highly Available File System for a Distributed Workstation Environment", IEEE Transactions on Computers, vol. 39, No. 4, pp. 447-459, Apr. 1990.

Tewari, Renu, et al., "Highly Availability in Clustered Multimedia Servers", (IEEE), Mar. 1996, pp. 645-654.

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

International Searching Authority, "Notification of Transmittal of the International Search Report or the Declaration," dated May 25, 2004, 6 pages.

Current Claims in PCT application, International Application No. PCT/US03/23747, 13 pages.

International Searching Authority, "Notification of Transmittal of the International Search Report and the Written Opinion of the International Searching Authority, or the Declaration," Application No. PCT/US2004/026570, Nov. 12, 2004, 13 pages.

Current Claims of International Application No. PCT/US2004/026570, 4 pages.

International Preliminary Examining Authority, "Written Opinion of the International Preliminary Examining Authority," Jun. 7, 2005, 4 pages.

Current Claims of International Application No. PCT/US04/26570, 4 pages.

International Searching Authority, "Notification of Transmittal of the International Search Report and the Written Opinion of the International Searching Authority, or the Declaration," Application No. PCT/US2004/025805, dated Dec. 3, 2004, 12 pages.

Current Claims of International Application No. PCT/US2004/025805, 8 pages.

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Preliminary Examining Authority, "Written Opinion of the International Preliminary Examining Authority," Jun. 7, 2005, 4 pages.

"Notice of Allowance and Fee Due" received in U.S. Appl. No. 10/917,843 received on Apr. 1, 2008 (7 pages).

* cited by examiner

CAPTURING AND RE-CREATING THE STATE OF A QUEUE WHEN MIGRATING A SESSION

RELATED APPLICATIONS AND CLAIM OF PRIORITY

This application claims benefit of Provisional Application Ser. No. 60/668,390, entitled "Capturing And Re-Creating The State Of A Queue When Migrating A Session", filed by Ravikanth Kasamsetty et al., on Apr. 4, 2005, the contents of which are herein incorporated by reference as if originally set forth herein, under 35 U.S.C. §119(e).

This application is related to U.S. Pat. No. 10/917,953, entitled "Transparent Session Migration Across Servers," filed by Sanjay Kaluskar et al., on Aug. 12, 2004, the contents of which are herein incorporated by reference as if originally set forth herein.

This application is related to U.S. Pat. No. 10/443,206, entitled "Buffered Message Queue Architecture for Database Management Systems," filed by Namit Jain et al., on May 21, 2003, the contents of which are herein incorporated by reference as if originally set forth herein.

This application is also related to U.S. Provisional Patent No. 60/601,346, entitled "Suspending a Result Set and Continuing from a Suspended Result Set for Transparent Session Migration," filed by Mehul Bastawala et al., on Aug. 12, 2004, the contents of which are herein incorporated by reference as if originally set forth herein.

This application is also related to U.S. Provisional Patent No. 60/601,250, entitled "Suspending a Result Set and Continuing from a Suspended Result Set," filed by Mehul Bastawala et al., on Aug. 12, 2004, the contents of which are herein incorporated by reference as if originally set forth herein.

This application is also related to U.S. Provisional Patent No. 60/601,259, entitled "Suspending a Result Set and Continuing from a Suspended Result Set for Scrollable Cursors," filed by Mehul Bastawala et al., on Aug. 12, 2004, the contents of which are herein incorporated by reference as if originally set forth herein.

FIELD OF THE INVENTION

The present invention relates to capturing and re-creating the state of a queue when migrating a session.

BACKGROUND

Many enterprise data processing systems rely on multi-node database servers to store and manage data. Such enterprise data processing systems typically follow a multi-tier model that has a multi-node database server in the first tier, and one or more computers in the middle tier and outer tiers.

Figure 6:
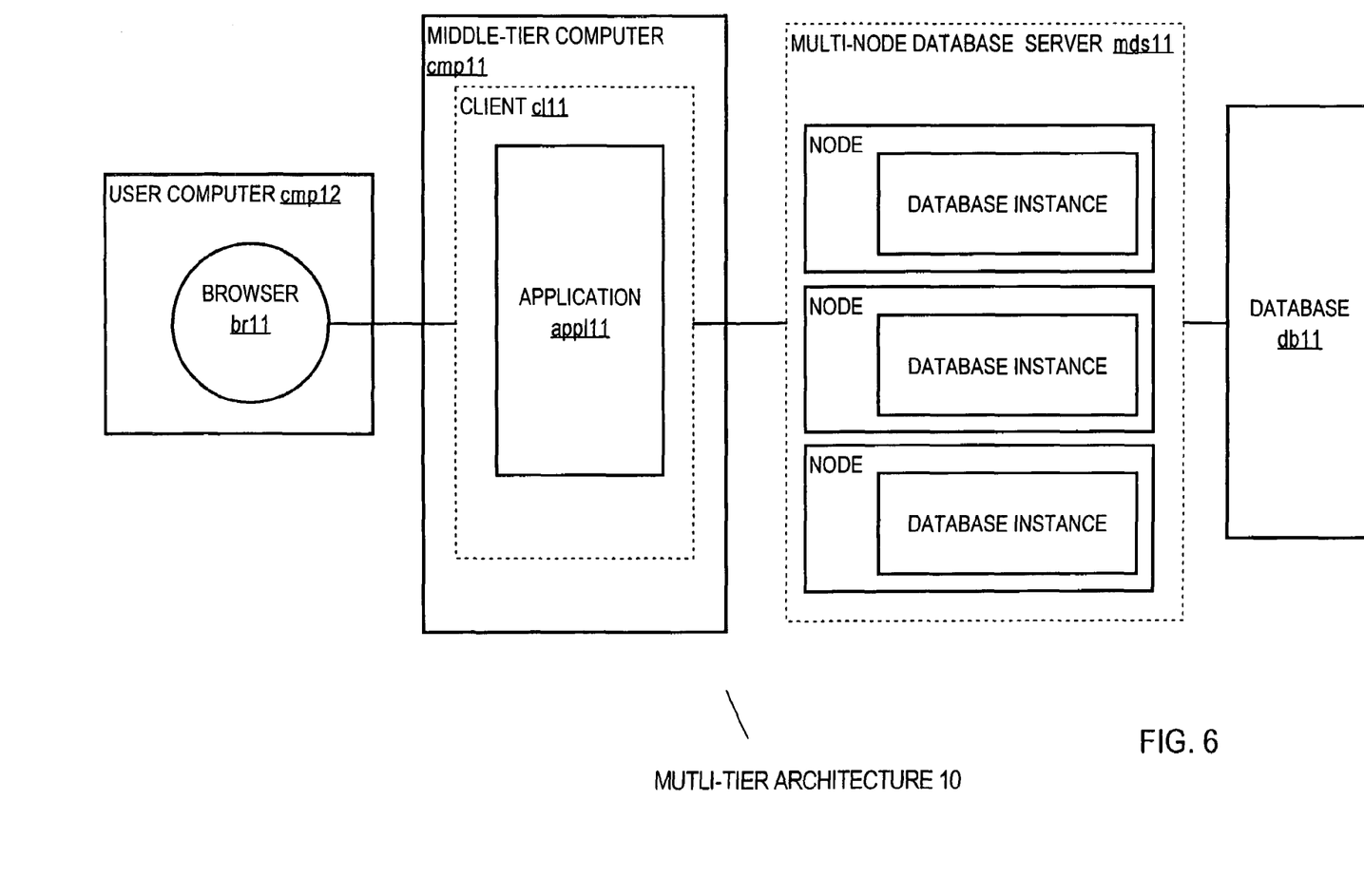
FIG. 6 depicts multi-node database server mds, which is implemented on multi-tier architecture.

FIG. 6 depicts multi-node database server mds11, which is implemented on multi-tier architecture 10. A server, such as multi-node database server mds11, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a multi-node computer system can be allocated to run a particular server's software. A particular combination of the software on a node and the allocation of the resources from the node is a server that is referred to herein as a server instance or instance. Thus, a multi-node server comprises multiple server instances that can run on multiple nodes. Several instances of a multi-node server can even run on the same node.

A database server governs and facilitates access to a particular database, processing requests by clients to access the database. A multi-node database server, such as multi-node database server mds11, comprises multiple "database instances", each database instance running on a node. Multi-node database server mds11 governs access to database db11. A multi-node database server can govern and facilitate access to one or more databases.

The middle-tier of multi-tier architecture 10 includes middle-tier computer cmp11 and the outer-tier includes user computer cmp12. User computer cmp12 executes browser br11, which interacts with an end-user. The end-user's interaction with browser br11 causes the browser to transmit requests over a network, such as the Internet, to middle-tier computer cmp11. The request causes a process on middle-tier computer cmp11, client c11, to execute application appl11. Execution of application appl11 by the client c11 causes client c11 to connect to multi-node database server mds11. For example, application appl11 may be an order entry application that is configured to receive order requests from browser br11. Data for the order entry application is stored in db11. To process the requests, execution of application appl11 by client c11 causes client c11 to connect to database db11. Once connected, client c11 issues database statements to retrieve and manipulate data stored in database db11.

The tier that directly connects to a server, relative to other tiers in a multi-tier architecture, is referred to herein as containing the client of the server. Thus, client process c11 is referred to herein as the client of multi-node database server mds11.

An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

An application, such application appl11, interacts with a multi-node database server mds11 via client-side interface component intcomp11. Execution of application appl11 causes client c11 to execute client-side interface component intcomp11 to interact with multi-node database server mds11. Application appl11 includes invocations of routines (e.g. functions, procedures, object methods, remote procedures) of client-side interface component intcomp11. Applications are typically developed by vendors and development teams different from those that develop servers and interfaces to servers, such as multi-node database server mds11 and client-side component intcomp11.

In order for a client to interact with multi-node database server mds11, a session is established for the client on a database instance of multi-node database server mds11. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session. A database component is a set of software modules that provide specialized and related functions for a database server, and shall be described later in greater detail. An example of a database component is a Java execution engine.

The beginning and end of a session demarcates a unit of work. Often, the beginning of a database session corresponds to an end-user establishing an interactive session with an application via, for example, a browser, and ends when the end-user logs off. Thus, the beginning and ending of the database session depend on application logic and end-user action, and may not be controlled by a server on which the session is established.

Client-Side Interface Components

Client-side interface components, such as client-side interface component intcomp11, are software components that reside and are executed on the same computer of a client of a server, and that are configured to provide an interface between the client and the server. The client-side interface component intcomp11 is configured for performing the detailed operations needed to interface with multi-node database server mds11. For example, an application appl11 invokes a function of client-side interface component intcomp11 to establish a connection to multi-node database server mds11. The client-side interface component then handles the details of a connection on a particular instance of multi-node database server mds11. To make requests of multi-node database server mds11, such as a request for execution of a query, application appl11 is configured to invoke functions of client-side interface component intcomp11, which then transmits a request for the same to the node and database instance on which the session is established.

Client-side interface component intcomp11 may generate and/or access state that is hidden from other software modules, that is, is not or may not be referenced and accessed by other software modules, and in particular, by application appl11. Such state is referred to as being internal or private to client-side interface component intcomp11.

For example, to create a database session on a multi-node database server mds11, application appl11 invokes a routine of client-side interface component intcomp11. The client-side interface component establishes a database session on a particular database instance within multi-node database server mds11, and stores details about the database session within internal data structures or objects. Such data structures and objects define, for example, the session established for an application, and specify such values as an identity of a session on a database instance, the name of the database instance, and a network address and port number for the connection to the database instance.

Such details of the session are not returned to application appl11, nor may application appl11 access the details. Instead, what is provided to application appl11 is an "external identifier" for the session, such as a value that internal data of client-side interface component intcomp11 maps to the session, or a reference to an object generated by client-side interface component intcomp11 to store some details of the session in private attributes of the object that are inaccessible to application appl11. In this way, application appl11 does not "know" of the specific details of the session that has been established for it; however, application appl11 has the information needed to be able to identify to client-side interface component intcomp11 the particular session that has been established for application appl11.

Distributing Workload

An important capability needed to manage multi-node database servers is to distribute workload between the nodes. Distributing workload is used to improve performance, by optimally balancing workload between nodes. Distributing workload also allows work to be shifted from a node that is being taken off-line for maintenance operations to another node.

Different techniques may be employed to migrate or move a session from one instance to another instance. Numerous patent applications identified in the section entitled "Related Application Data" discuss various techniques for migrating sessions from one node of a multi-node system to another node of the multi-node system. Briefly, to migrate a session ("the original session") from a first instance on a first node to a second instance on a second node, the second node is identified by the entity that is initiating the migration. A new session ("the migrated session") is created on the second node. Session state information may then be transferred from the original session to the new session so that the new session on the second node reflects the same state as the original session on the first node. Thereafter, the migrated session on the second node is used in lieu of the original session to perform the work that would have been performed in the original session.

Messaging Systems

A process within a session may interact with a variety of database objects. A database object may be used to implement a queue of messages. In such a case, the queue of messages is accessible to all server instances that can access the database maintaining the queue of messages.

A queue of messages may be used to implement a messaging system. In a messaging system, a queue contains messages, which may be (a) added to the queue (or "enqueued") by publishers, or (b) removed from the queue (or "dequeued") by subscribers or recipients. When a queue is implemented using a database object, a database may maintain a queue by storing information about the queue in a table. A publisher may enqueue a message into a queue by inserting a row into a table implementing the queue. A subscriber may dequeue a message from the queue by selecting and/or deleting a row from the table. Various techniques for implementing a queue of messages are described in the patent application referenced in the Related Application Data section entitled "Buffered Message Queue Architecture for Database Management Systems."

When a process within a session interacts with a queue of messages, the session state reflects how many messages have been queued or dequeued from the queue. In this way, the proper behavior of the queue is ensured. However, when a session, containing session state information that describes the state of a queue, is migrated from one instance to another instance, the session state information describing the state of the queue cannot be preserved during migration to the new session according to the present state of the art. As a result, when a process in the migrated session enqueues or dequeues messages from the queue, the proper behavior of the queue cannot be guaranteed. For example, if a process in the migrated session dequeues a message, a different message may be dequeued from the queue of messages than if the same operation was performed in the original session. Thus, known techniques for migrating a session cannot migrate a session if the session contains queuing state information describing the state of a queue of messages.

Consequently, an approach to migrate a session containing queuing state information that describes the state of a queue is needed in the art. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Techniques for migrating the queuing state of a session are presented herein. Using an embodiment of the invention, after an original session has been migrated from one node to another node, a process, executing in the migrated session, may enqueue and dequeue messages from a queue of messages and experience the same behavior from the queue of messages as if the process was enqueuing and dequeuing messages in the original session.

The queue of messages discussed with respect to embodiments of the invention may be used to implement a messaging system. As is well known to those in the art, messaging systems allow publishers to enqueue messages to a queue, and subscribers to dequeue messages from a queue. There are several varieties of messaging systems. For example, a point-to-point messaging system allows a single publisher to enqueue messages to a queue, and allows a single subscriber to dequeue from that queue. Other messaging systems exist that allow multiple publishers to enqueue messages to a queue, and allow multiple subscribers to dequeue from the queue.

Messaging systems may be implemented numerous ways. Some varieties of messaging systems are implemented using a database. For example, the messaging systems discussed herein implement a queue by storing information in a database table. However, the inventive techniques discussed herein are applicable to the general context of messaging systems, regardless of how the messaging system is implemented. Thus, while certain embodiments of the invention discuss implementing a queue of messages in a database table, the inventive teachings presented herein may be applied to any messaging system, and are not limited to the particular examples presented herein where a queue of messages is implemented using a database.

Functional Overview

Techniques are presented herein for migrating the session state of an original session from a first server to a second server, such that a process, executing in the migrated session, may enqueue and dequeue messages from a queue of messages and experience the same behavior from the queue of messages as if the process was enqueuing and dequeuing messages in the original session. Advantageously, all the benefits of migrating a session from one instance to another instance may be realized, even when the session contains queuing state information that describes the state of a queue of messages.

Figure 1:
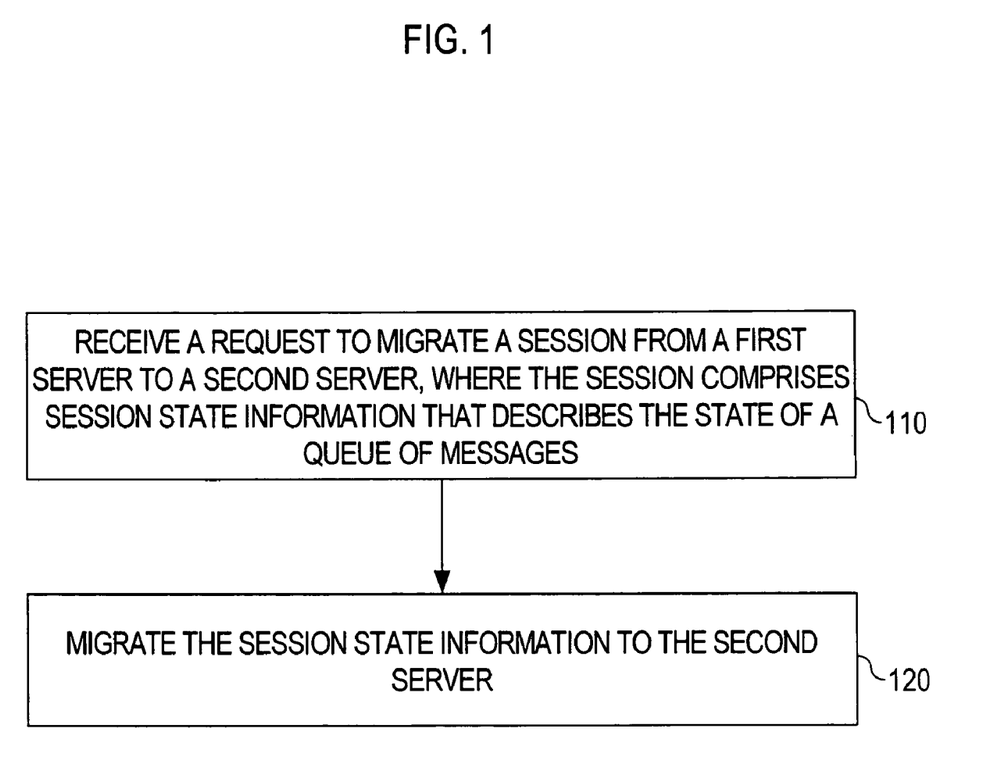
FIG. 1 is a flowchart illustrating the functional steps of migrating a session according to an embodiment of the invention.

An embodiment of the invention shall be discussed with reference to FIG. 1, which is a flowchart illustrating the functional steps of migrating a session according to an embodiment of the invention. In explaining the steps of FIG. 1, reference will be made to FIG. 2, which is a block diagram of a system according to an embodiment of the invention.

Figure 2:
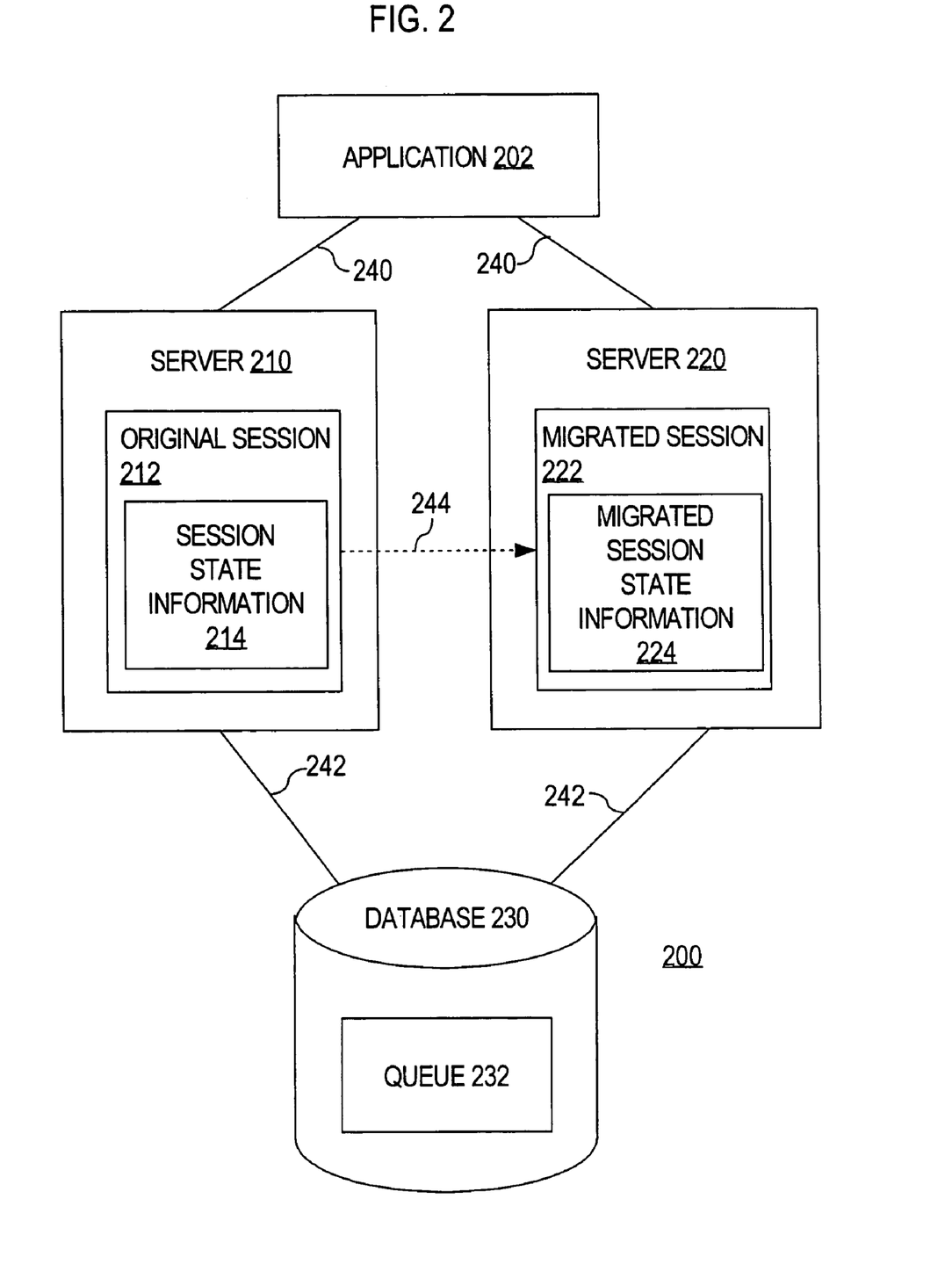
FIG. 2 is a block diagram of a system according to an embodiment of the invention.

In step 110, a request to migrate an original session 212, established on server 210, to server 220 is received. Since different parties may initiate the migration of a session, depending on the particular implementation of the system 100, the request to migrate the original session 212 from server 210 to server 220 may be sent or received by a variety of parties, as long as the sending party is responsible for initiating migration of the session and the receiving party is responsible for performing the migration. For example, in one embodiment of the invention, application 202 may send the request of step 110 to server 210 over communications link 240. Application 202 may be implemented by software capable of issuing a request to server 210 and server 220, e.g., a database application. Communications link 240 may be implemented by any medium or mechanism that provides for the exchange of data between application 202 and a server, including, without limitation, a network such as a Local Area Network (LAN), Wide Area Network (WAN), Ethernet or the Internet, or one or more terrestrial, satellite or wireless links.

In another embodiment of the invention, server 210 may initiate its own request to migrate the original session 212 to server 220. Such an embodiment may be employed when an administrator instructs server 210 to migrate sessions being supported by server 210 to another node, which may happen if the administrator plans to shut server 210 down.

A process executing in the original session 212 has accessed a queue of messages 232 over communications link 242. Communications link 242 may be implemented by any medium or mechanism that provides for the exchange of data between a server and queue of messages 232, including, without limitation, a network such as a Local Area Network (LAN), Wide Area Network (WAN), Ethernet or the Internet, or one or more terrestrial, satellite or wireless links. Thus, queuing state information 214, stored in private data structures associated with the original session 212, stores information describing the current state of the queue of messages 232 with respect to the original session 212. For example, the queuing state information may identify how many messages have been enqueued or dequeued from the queue of messages 232 by processes in the original session 212.

In an embodiment, the queue of messages 232 may be implemented in a database 230. In such an embodiment, the queue of messages may be implemented using the AQ (Advanced Queuing) feature provided by the Oracle 10g database, available from Oracle Corporation of Redwood Shores, Calif. In other embodiments (not shown), the queue of messages 232 may be implemented on a computer system without the use of a database.

After the request of step 110 is received by the party responsible for migrating sessions from server 210 to server 220, the queuing state information 214 is migrated from server 210 to server 220 over communications link 244 in step 120. Communications link 244 may be implemented by any medium or mechanism that provides for the exchange of data between server 210 and server 220, including, without limitation, a network such as a Local Area Network (LAN), Wide Area Network (WAN), Ethernet or the Internet, or one or more terrestrial, satellite or wireless links. As a result of performing step 120, migrated queuing state information 224 is received by server 220 (as shown in FIG. 2).

Advantageously, the performance of step 120 allows server 220 to initiate a migrated session 222, and the migrated session 222 may access the migrated queuing state information 224. As a result, since migrated session 222 has access to the same queuing state information as the original session 212 on server 210, a process executing in the migrated session 222 that access the queue of messages 232 experience the same behavior as if the process were executing in the original session 212 on server 210.

After the migrated session 222 has been established on server 220, a user connected through the original session 212 is migrated to the migrated session 222. For example, one or more processes of application 202 that were connected through the original session 212 may be migrated to the migrated session 222 on server 220. Existing techniques for migrating a user from the original session 212 to the migrated session 222 may be employed, such as those techniques discussed by applications listed in the section entitled "Related Application Data."

Figure 3:
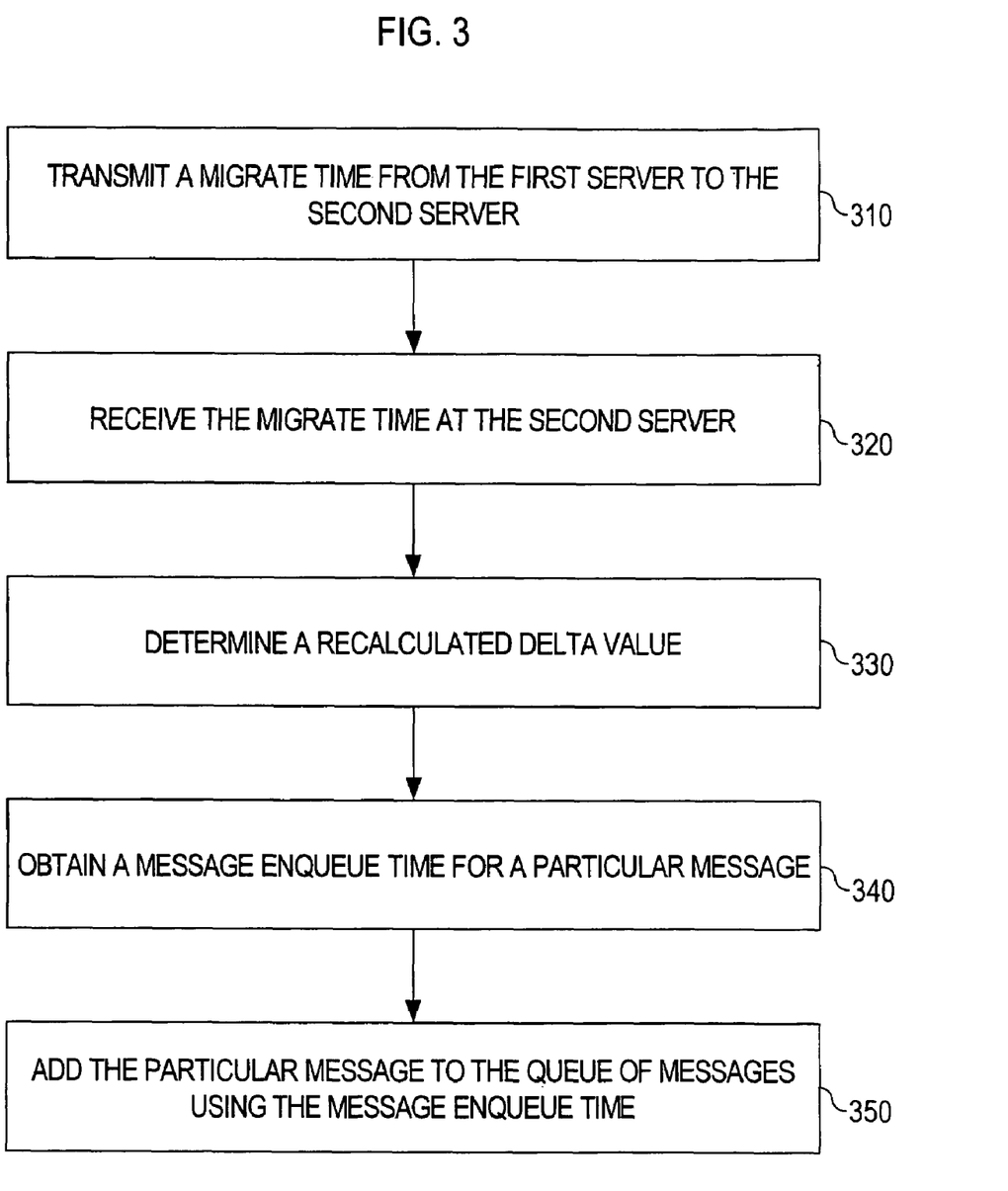
FIG. 3 is a flowchart illustrating the functional steps of capturing and re-creating the enqueue state of a queue according to an embodiment of the invention.

The performance of migrating the queuing state information 214 from server 210 to server 220 shall be discussed in greater detail below. FIG. 3 and its accompanying explanation discuss techniques for capturing and re-creating the enqueue state of the queue of messages 232 during the performance of step 120, and FIG. 4 and its accompanying explanation discuss techniques for capturing and re-creating the dequeue state of the queue of messages 232 during the performance of step 120.

As used herein, "enqueue" means to add a message to a queue. Thus, the enqueue state of a queue of messages refers to the set of information necessary to add a message to a queue while preserving the proper order of messages within the queue. As used herein, "dequeue" means to remove a message from a queue. Thus, the dequeue state of a queue refers to the set of information necessary to remove a message from a queue while preserving the proper order of messages within the queue. As explained in further detail below, the enqueue state and dequeue state of a queue may be different relative to one publisher or subscriber than it is relative to another publisher or subscriber.

Capturing and Re-Creating the Enqueue State of a Queue

FIG. 3 is a flowchart illustrating the functional steps of capturing and re-creating the enqueue state of a queue according to an embodiment of the invention. Messages in a queue are ordered relative to a logical timestamp that indicates when the messages were added to the queue (the "enqueue timestamp" of the message). However, if the logical time of server 210 is greater than (the logical clock of server 210 is faster than the logical clock of server 220), then it is possible that when messages are enqueued by a process at server 220, the order of the messages in the queue of messages 232 may become disrupted with respect to that process. FIG. 3 presents a technique for adjusting the enqueue timestamp associated with a message added to the queue of messages 232 to preserve the proper order of messages in the queue of messages 232 when the original session 212 is migrated from server 210 to server 220. The functional steps of FIG. 3 may be performed in the performance of step 120 of FIG. 1.

According to an embodiment of the invention, when a message is added to the queue of messages by a process in migrated session 222, the enqueue timestamp associated with the added message is adjusted to preserve the proper order of messages in the queue of messages 232. The enqueue timestamp may be adjusted to reflect the difference between the logical clock of the source environment (server 210 in this example) and the logical clock of the destination environment (server 220 in this example). In this way, the state of the queue of messages may be preserved when a session is migrated from a source environment to a destination environment, even if the logical clocks of the source environment and the destination environment reflect different logical times.

To explain this technique in further detail with reference to FIG. 3, in step 310, when a session is migrated from server 210 to server 220, the migrate time of server 210 is transmitted from server 210 to server 220 over communications link 244. The migrate time reflects the sum of (a) the current system time of server 210 and (b) a delta value.

If the original session 212 established on server 210 was not previously migrated from another server, then the delta value has a value of zero. For example, if original session 212 on server 210 was initiated on server 210, then the original session 212 on server 210 was not migrated from another other node; therefore, the delta value would have a value of zero.

However, if the original session 212 on server 210 was previously migrated from another server (in other words, original session 212 was originally initiated on another node other than server 210), then the delta value may have a value different than zero, as explained in further detail below.

In sum, the migrate time may be expressed in pseudocode as follows:

migrate time=current system time at the source node+ delta value

After the performance of step 310, processing proceeds to step 320.

In step 320, the migrate time of the source node is received at the destination node. For example, if in step 310, server 210 transmitted the migrate time to server 220, then step 320 may be performed by server 220 receiving the migrate time of server 210. After the migrate time of the source node is received at the destination node, processing proceeds to step 330.

In step 330, a recalculated delta value is determined. The recalculated delta value corresponds to the amount of time that should be added to the current system time of the destination node to create the enqueue timestamp that should be used when inserting a message into the queue of messages 232 by a process in the migrated session 222 at the destination node. If the migrate time of the source node received in step 320 is not more recent than the current system time of the destination node, then the recalculated delta value has a value of zero. For example, if the migrate time of server 210 received in step 320 is not more recent than the current system time of server 220, then the recalculated delta value has a value of zero.

However, if the migrate time of the source node received in step 320 is more recent than the current system time of the destination node, then that means that the current system time of the destination node may be older than the enqueue timestamp of messages in the queue. Therefore, if the destination node simply used the current system time as the enqueue timestamp, then messages added to the queue of messages 232 by a process in the migrated session 222 at the destination node may become out of order. Thus, the recalculated delta value is equal to the difference between the migrate time of the source node and the current system time at the destination node. In the example shown in FIG. 2, the recalculated delta value is equal to the difference between the migrate time of server 210 and the current system time at server 220.

In sum, the determination of the recalculated delta value may be expressed in pseudocode as follows:

```
IF (migrate time of source node>current system time of destination node)
    delta value=migrate time of source node–current system time of the destination node
ELSE
    delta value=0
ENDIF
```

After the recalculated delta value is determined, processing proceeds to step 340.

In step 340, a message enqueue timestamp for a particular message is obtained in response to the need, by a process in the migrated session 222 at the destination node, to add the particular message to the queue of messages 232. To illustrate using the above example, if a process in migrated session 222, executing on server 220, requires a particular message to be added to the queue of messages 232, then step 340 is performed.

The message enqueue timestamp reflects the sum of the recalculated delta value (determined in step 330) and the current system time of the destination node. After the message enqueue timestamp is obtained for the particular message, processing proceeds to step 350.

In step 350, the particular message is added to the queue of messages 232 using the message enqueue timestamp obtained in step 340. To illustrate using the above example, if an operation performed in migrated session 222 causes the particular message to be added to the queue of messages 232, then the particular message is added to the queue of messages 232 using the message enqueue timestamp, rather than the current system time of the destination node (server 220). In this way, even if the destination node has a current system time than is slower than the current system time of the source node, messages in the queue of messages 232 will not become out of order with the addition of one or more messages by an operation performed in the migrated session 222 on server 220.

A session may be migrated more than once. The functional steps of FIG. 3 described above (a) may be used on a session that has migrated more than once, and (b) ensure that when the session migrates across several nodes, each node having a different logical clock, the enqueue timestamps of newly added messages are always greater than the enqueue timestamps of any previously enqueued messages.

In other words, the value of the migrate time is equal to the maximum value of the timestamps that were current at the time of migration. In this way, if a session is initiated on node A, an operation in that session is performed that involves the queue of messages 232, then the session is migrated to node B, and then the session is migrated to node C, the queuing state information describing the enqueue state of the queue of messages 232 will be preserved, as the migrate time reflects the fastest logical clock of any node that maintained the session. Thus, a session that maintains a queue of messages may be migrated to any number of nodes while preserving the state of the queue of messages 232, irrespective of the logical clocks of the nodes upon which the session is executed.

Having described above an approach for migrating queuing state information that describes the enqueue state of the queue of messages 232 from server 210 to server 220, techniques shall be presented below for migrating queuing state information that describes the dequeue state of the queue of messages 232 from server 210 to server 220.

Capturing and Re-Creating the Dequeue State of a Queue

Figure 4:
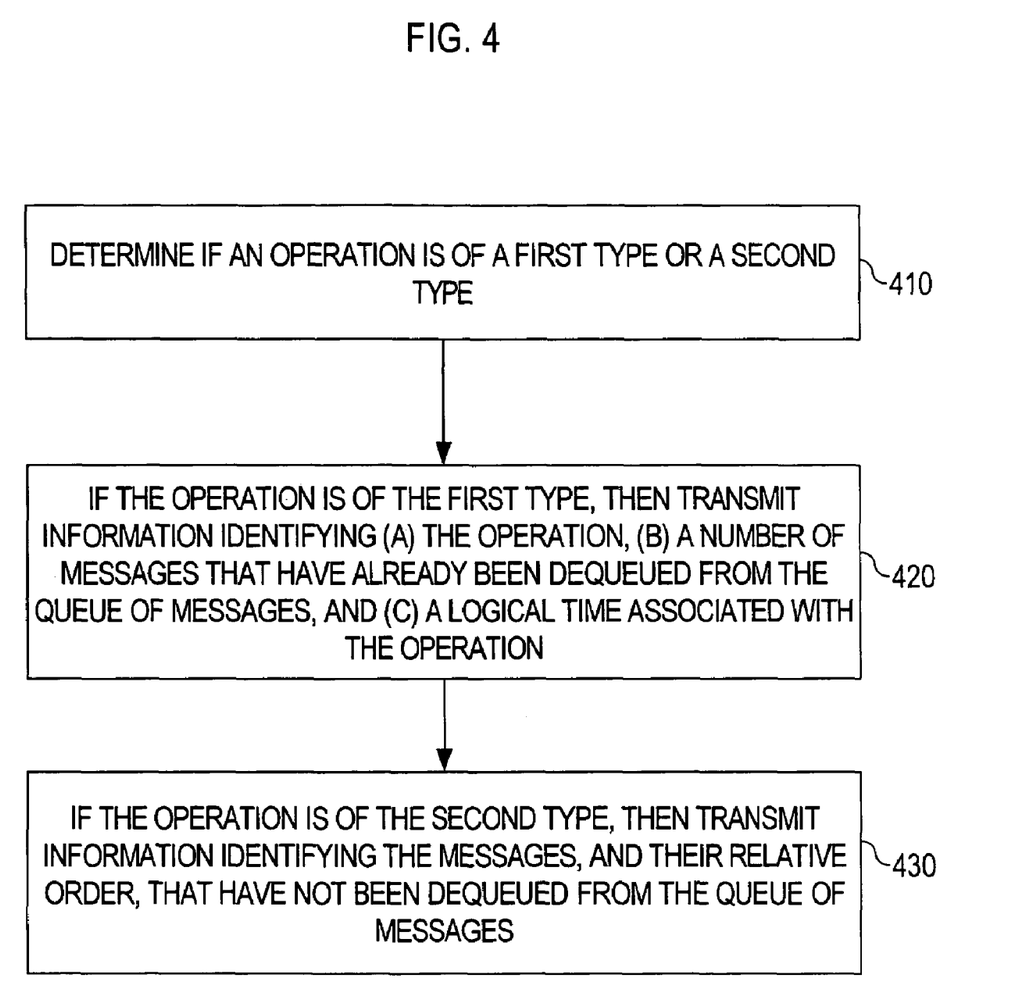
FIG. 4 is a flowchart illustrating the functional steps of capturing and re-creating the dequeue state of a queue according to an embodiment of the invention.

FIG. 4 is a flowchart illustrating the functional steps of capturing and re-creating the dequeue state of a queue according to an embodiment of the invention. The purpose of the functional steps of FIG. 4 is to ensure that when messages are removed from the queue of messages 232 by processes executing in the migrated session 222 on server 220, the messages are removed in the same sequence as they would have been removed by a process executing in the original session 212. The functional steps of FIG. 4 may be performed in the performance of step 120 of FIG. 1.

Initially, in step 410, a determination is made as to whether a dequeue operation, performed on the queue of messages, is a "repeatable" operation or a "non-repeatable" operation. For example, if a dequeue operation was performed on the queue of messages 232, then in step 410 a determination is made as to whether the dequeue cursor result set is a repeatable operation or a non-repeatable operation.

An operation is repeatable if, at a particular logical time, the operation produces the same result set regardless of whether the operation is performed on the source node (server 210) or the destination node (server 220). If the operation of step 410 is not a repeatable operation, then the operation is a "non-repeatable" operation. For example, an operation may not be repeatable if the dequeue operation is performed using a correlation id or using a condition. If a dequeue operation is a non-repeatable operation, then the result set of the dequeue operation is not guaranteed to be the same when the cursor is re-executed at the destination node. After the performance of step 410, processing proceeds to step 420.

In step 420, if the operation of step 410 is a repeatable operation, then a certain set of information is transmitted from server 210 to server 220 over communications link 244. In an embodiment, the certain set of information transmitted from server 210 to server 220 in step 420 includes information that specifies the following: (a) the operation, (b) the number of messages that have already been dequeued from the queue of messages 232 by processes in the original session 212, and (c) a logical time (such as a current system time) associated with the operation, e.g., the logical time associated with the operation may be snapshot time or system change number associated with the operation. As the operation of step 410 is repeatable, using the information transmitted from server 210 to server 220 in step 420, the dequeue state of the queue of messages may be recreated at server 220 using the information transmitted from the server 210 to server 220 in step 420.

In an embodiment, the performance of step 420 may be performed with assistance from the flashback query feature provided by Oracle 10g, available from Oracle Corporation of Redwood Shores, Calif. After the performance of step 420, processing proceeds to step 430.

In step 430, if the operation of step 410 is a non-repeatable operation, then a certain set of information is transmitted from server 210 to server 220 in step 430. Because the operation of step 410 is a non-repeatable operation, the result of performing the operation on server 220 is not guaranteed to be the same as the result of performing the same operation on server 210.

Consequently, in an embodiment, in step 430, information describing all the messages in the queue of messages 232 is transmitted from server 210 to server 220 over communications link 244. In this way, a server 220 may fetch (dequeue) messages directly from the transferred information, rather than performing a dequeue on the queue of messages 232. One way of accomplishing this step is to store all messages that have not been dequeued from the queue of messages 232 in a LOB at server 210, and thereafter transmit the LOB to server 220. Server 220 may thereafter fetch (dequeue) messages directly from the received LOB. Techniques for migrating the state of a result set, which may be used in the performance of step 430, are discussed in applications identified in the section entitled "Related Application Data."

Multiple Users Accessing a Queue of Messages

The queue of messages 232 may be implemented by storing data in a database table. More than one user may access the same database table, and thus, more than one user may access the queue of messages 232. When one user, or subscriber, dequeues a message from the queue of messages, the state of the queue has been changed only with respect to that subscriber. Thus, in an embodiment, data is stored at or accessible to the location where the queue of messages 232 is maintained that indicates how many messages each subscriber, of the queue of messages, has removed from the queue of messages 232. For example, in the embodiment of the invention shown in FIG. 2, the queue of messages 232 is implemented in database 230, thus, the data indicating how many messages each subscriber has removed from the queue of messages 232 may also be stored in database 230. In other embodiments of the invention that do not implement queue of messages 232 in a database (not shown), the data indicating how many messages each subscriber has removed from the queue of messages 232 may either be stored where the queue of messages 232 is implemented or in a location accessible to the queue of messages 232.

In this way, if two subscribers are accessing the queue of messages 232, but the two subscribers have dequeued a different number of messages, the state of the queue of messages may be maintained for each subscriber. By accessing the data that indicates how many messages a subscriber has already dequeued from the queue of messages, an instance may determine which message is the next message to be dequeued for a particular subscriber, even if the particular subscriber has dequeued a different number of messages from the queue of messages than other subscribers.

Implementing Mechanisms

Figure 5:
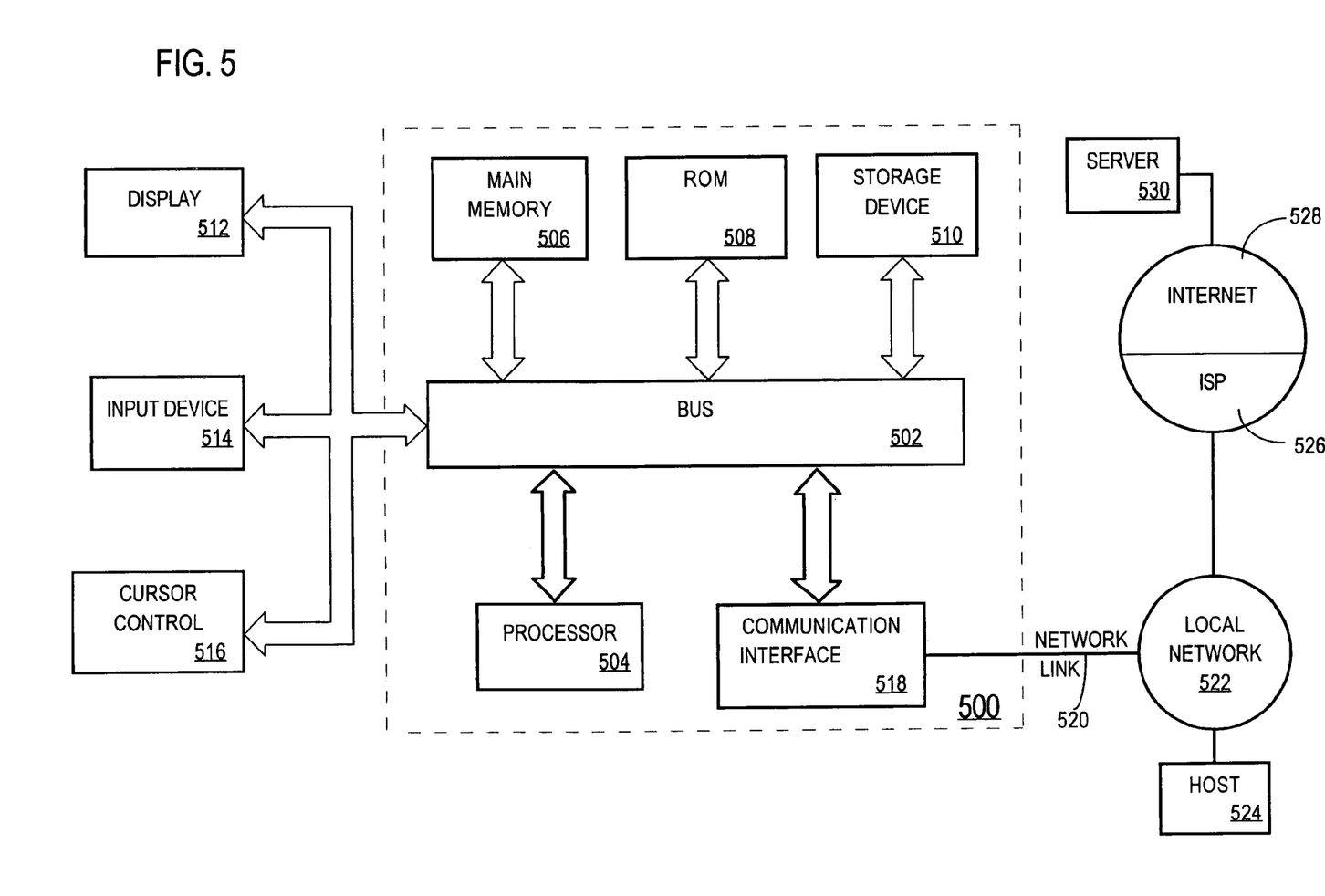
FIG. 5 is a block diagram that illustrates a computer system upon which an embodiment of the invention may be implemented.

In an embodiment, server 210, server 220, and database 230 may each be implemented on a computer system. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
while a first session is established for a client on a first server, receiving a request to migrate the first session established on the first server from the first server to a second server;
wherein the first session comprises queuing state information that describes, with respect to the first session, the ordering of messages in a queue of messages;
migrating the queuing state information to the second server;
establishing a second session for the client on the second server;
wherein the second session includes the queuing state information migrated to the second server; and
wherein the queuing state information migrated to the second server describes, with respect to the second session, the same ordering of messages in the queue of messages that was described by the queuing state information included in the first session.

2. The method of claim 1, further comprising:
migrating a user connected through the first session from the first session to the second session.

3. The method of claim 1, wherein the step of migrating the queuing state information to the second server comprises:
transmitting, from the first server to the second server, a migrate time, wherein the migrate time reflects the sum of the current system time of the first server and a delta value,
wherein, if the gueuing state information was previously migrated from a third server to the first server, then the delta value reflects a difference between the logical clocks of the third server and the first server at a time the gueuing state information was migrated from the third server to the first server, and
wherein, if the gueuing state information was not previously migrated from a third server to the first server, then the delta value has a value of zero.

4. The method of claim 3, wherein the step of migrating the queuing state information to the second server further comprises:
receiving, at the second server, the migrate time; and
determining a recalculated delta value, wherein:
if the migrate time is more recent than the current system time of the second server, then the recalculated delta value is equal to the difference between the migrate time and the current system time of the second server; and
if the migrate time is not more recent than the current system time of the second server, then the recalculated delta value has a value of zero.

5. The method of claim 4, wherein the step of migrating the queuing state information to the second server further comprises:
obtaining a message enqueue time for a particular message, wherein the message enqueue time reflects the sum of the recalculated delta value and the current system time of the second server; and
adding the particular message to the second queue of messages using the message enqueue time.

6. The method of claim 1, wherein the step of migrating the queuing state information to the second server comprises:
determining if a dequeue operation is of a first type or a second type;
if said dequeue operation is of the first type, then transmitting, from the first server to the second server, information identifying (a) the operation, (b) a number of messages that have already been dequeued from the first queue of messages, and (c) a logical time associated with the operation; and if said dequeue operation is of the second type, then transmitting, from the first server to the second server, information identifying the messages, and their relative order, that have not been dequeued from the first queue of messages.

7. The method of claim 6, wherein said information identifying the messages, and their relative order, that have not been dequeued from the first queue of messages is maintained in a LOB.

8. The method of claim 1, wherein the first server and the second server are both database servers.

9. The method of claim 1, wherein the queue of messages is implemented in a database.

10. The method of claim 1, further comprising the steps of:
storing, at the second server, dequeue data that indicates how many messages each of two or more users have removed from the second queue of messages; and
determining how to process a request to dequeue an message from the second queue of messages based on the dequeue data.

11. A machine-readable storage medium storing one or more sequences of instructions, wherein execution of the one or more sequences of instructions by one or more processors causes the one or more processors to perform the steps of:
while a first session is established for a client on a first server, receiving a request to migrate the first session established on the first server from the first server to a second server;
wherein the first session comprises queuing state information that describes, with respect to the first session, the ordering of messages in a queue of messages;
migrating the queuing state information to the second server;
establishing a second session for the client on the second server;
wherein the second session includes the queuing state information migrated to the second server; and
wherein the queuing state information migrated to the second server describes, with respect to the second session, the same ordering of messages in the queue of messages that was described by the queuing state information included in the first session.

12. The machine-readable storage medium of claim 11, wherein execution of the one or more sequences of instructions by the one or more processors causes the one or more processors to further perform the step of:
migrating a user connected through the first session from the first session to the second session.

13. The machine-readable storage medium of claim 11, wherein the step of migrating the queuing state information to the second server comprises:
transmitting, from the first server to the second server, a migrate time, wherein the migrate time reflects the sum of the current system time of the first server and a delta value,
wherein, if the queuing state information was previously migrated from a third server to the first server, then the delta value reflects a difference between the logical clocks of the third server and the first server at a time the queuing state information was migrated from the third server to the first server, and
wherein, if the queuing state information was not previously migrated from a third server to the first server, then the delta value has a value of zero.

14. The machine-readable storage medium of claim 13, wherein the step of migrating the queuing state information to the second server further comprises:
receiving, at the second server, the migrate time; and
determining a recalculated delta value, wherein:
if the migrate time is more recent than the current system time of the second server, then the recalculated delta value is equal to the difference between the migrate time and the current system time of the second server; and
if the migrate time is not more recent than the current system time of the second server, then the recalculated delta value has a value of zero.

15. The machine-readable storage medium of claim 14, wherein the step of migrating the queuing state information to the second server further comprises:
obtaining a message enqueue time for a particular message, wherein the message enqueue time reflects the sum of the recalculated delta value and the current system time of the second server; and
adding the particular message to the second queue of messages using the message enqueue time.

16. The machine-readable storage medium of claim 11, wherein the step of migrating the queuing state information to the second server comprises:
determining if a dequeue operation is of a first type or a second type;
if said dequeue operation is of the first type, then transmitting, from the first server to the second server, information identifying (a) the operation, (b) a number of messages that have already been dequeued from the first queue of messages, and (c) a logical time associated with the operation; and
if said dequeue operation is of the second type, then transmitting, from the first server to the second server, information identifying the messages, and their relative order, that have not been dequeued from the first queue of messages.

17. The machine-readable storage medium of claim 16, wherein said information identifying the messages, and their relative order, that have not been dequeued from the first queue of messages is maintained in a LOB.

18. The machine-readable storage medium of claim 11, wherein the first server and the second server are both database servers.

19. The machine-readable storage medium of claim 11, wherein the queue of messages is implemented in a database.

20. The machine-readable storage medium of claim 11, wherein execution of the one or more sequences of instructions by the one or more processors causes the one or more processors to further perform the steps of:
storing, at the second server, dequeue data that indicates how many messages each of two or more users have removed from the second queue of messages; and
determining how to process a request to dequeue an message from the second queue of messages based on the dequeue data.

* * * * *

UNITED STATES PATENT AND TRADEMARK OFFICE
CERTIFICATE OF CORRECTION

PATENT NO. : 7,415,470 B2 Page 1 of 1
APPLICATION NO. : 11/131653
DATED : August 19, 2008
INVENTOR(S) : Kasamsetty et al.

It is certified that error appears in the above-identified patent and that said Letters Patent is hereby corrected as shown below:

Title page 2, in column 2, under "Other Publications", line 10, delete "Dec. 12003," and insert -- Dec. 1, 2003, --, therefor.

On sheet 6 of 6, in Figure 6, at the bottom, line 1, delete "MUTLI" and insert -- MULTI --, therefor.

In column 3, line 30, delete "app11" and insert -- appl11 --, therefor.

In column 14, line 30, in claim 3, delete "gueuing" and insert -- queuing --, therefor.

In column 14, line 34, in claim 3, delete "gueuing" and insert -- queuing --, therefor.

In column 14, line 36, in claim 3, delete "gueuing" and insert -- queuing --, therefor.

In column 15, line 21, in claim 10, delete "an" and insert -- a --, therefor.

In column 16, line 60, in claim 20, delete "an" and insert -- a --, therefor.

Signed and Sealed this

Sixteenth Day of March, 2010

David J. Kappos
*Director of the United States Patent and Trademark Office*